May 31, 1960 V. H. GAFFNEY 2,938,586
ROTARY ROCK WINDROWER
Filed Oct. 31, 1958 4 Sheets-Sheet 1
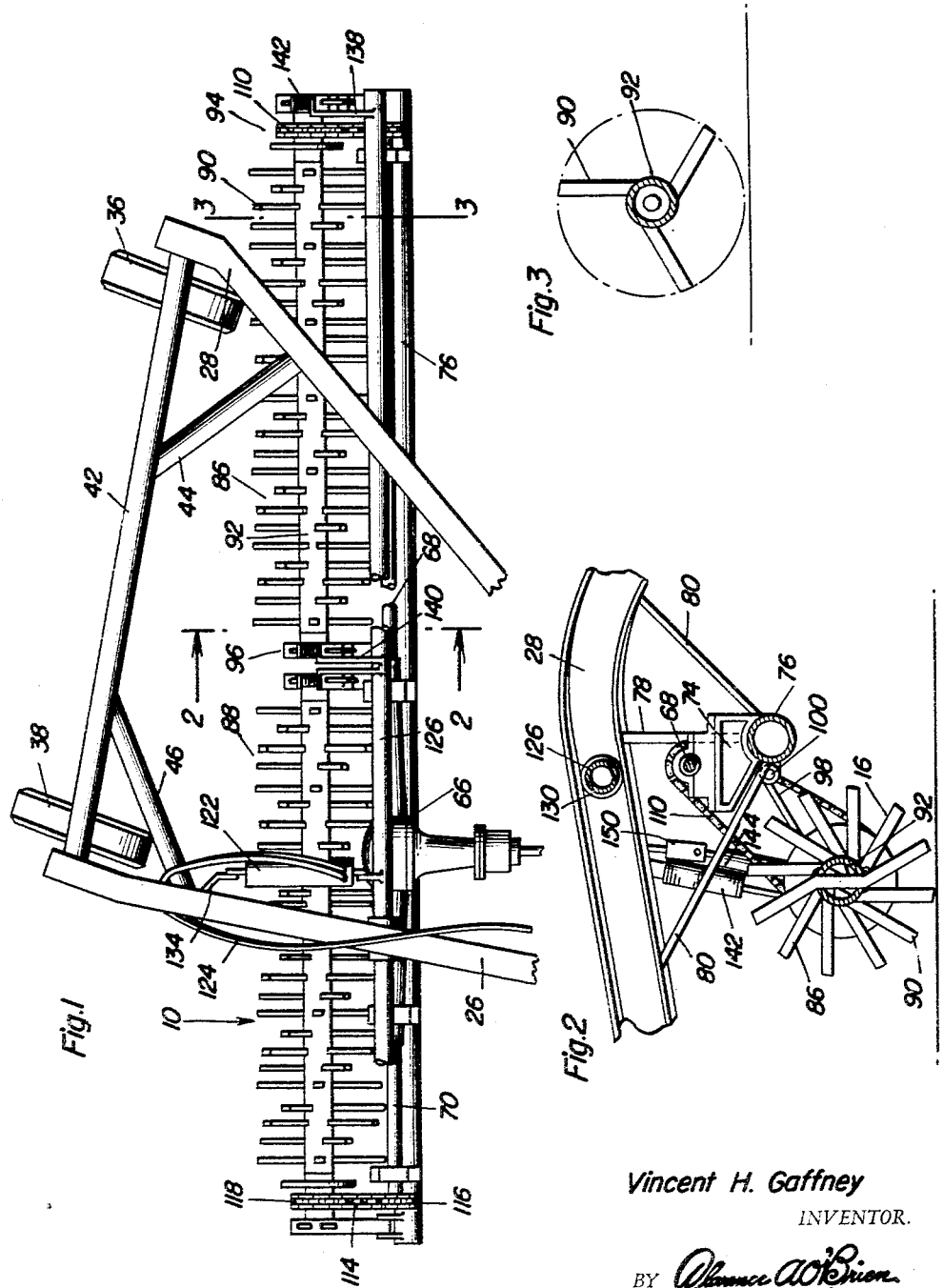
Vincent H. Gaffney
INVENTOR.

May 31, 1960
V. H. GAFFNEY
2,938,586
ROTARY ROCK WINDROWER
Filed Oct. 31, 1958
4 Sheets-Sheet 2
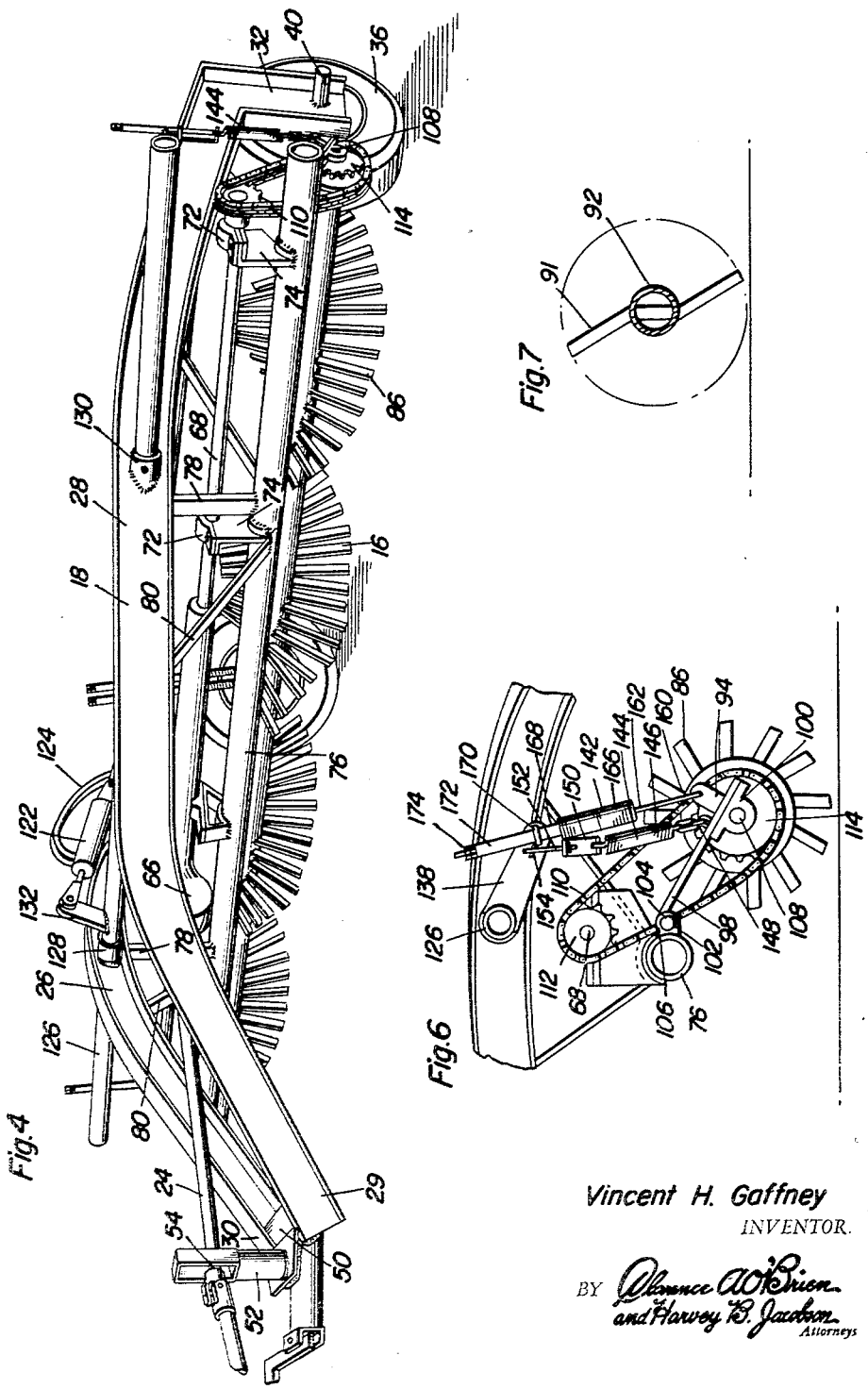
Vincent H. Gaffney
INVENTOR.
BY Clarence A. O'Brien
and Harvey B. Jackson
Attorneys

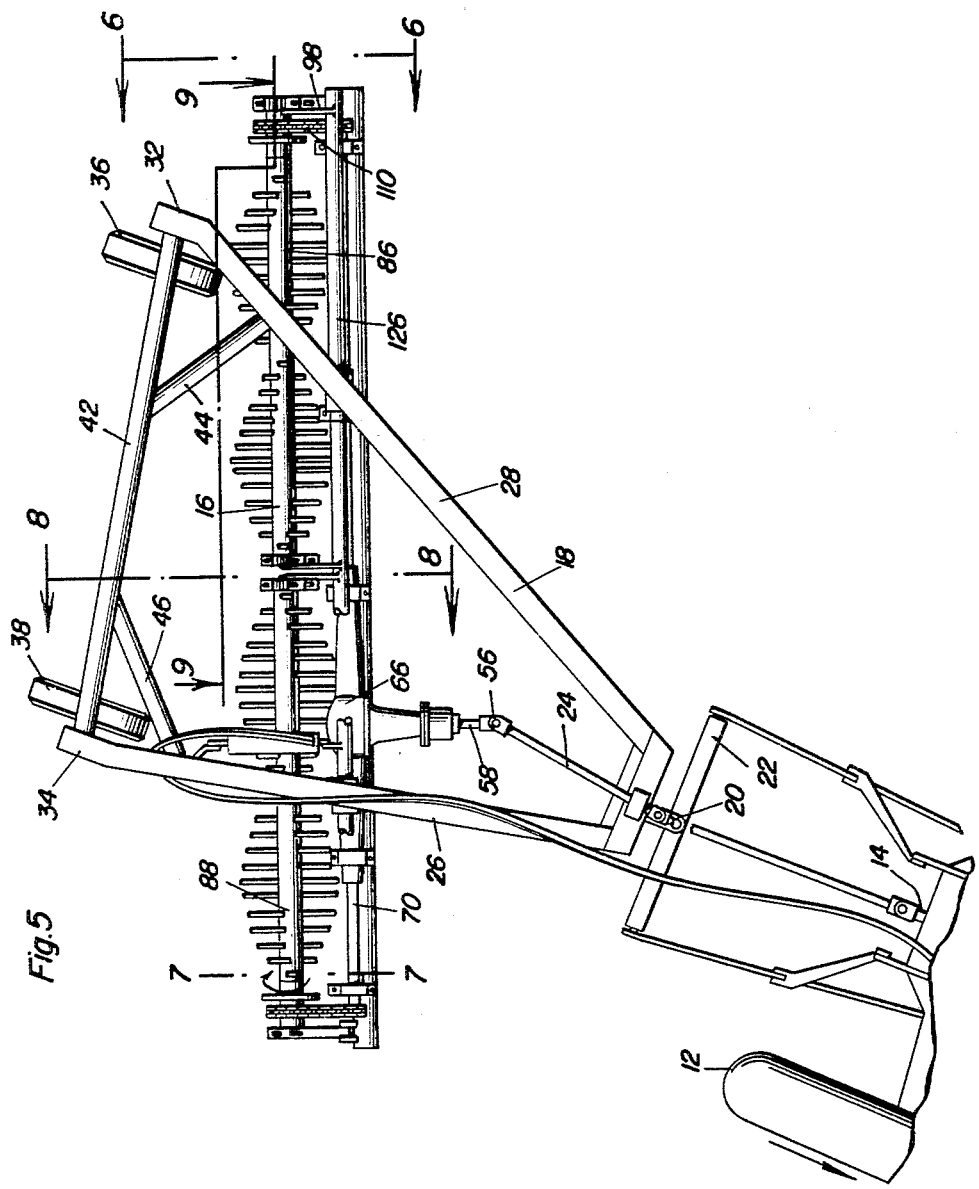

May 31, 1960 V. H. GAFFNEY 2,938,586
ROTARY ROCK WINDROWER
Filed Oct. 31, 1958 4 Sheets-Sheet 4

Vincent H. Gaffney
INVENTOR.

United States Patent Office 2,938,586
Patented May 31, 1960

2,938,586

ROTARY ROCK WINDROWER

Vincent H. Gaffney, Medicine Lake, Mont.

Filed Oct. 31, 1958, Ser. No. 770,953

4 Claims. (Cl. 171—63)

This invention relates to a windrower and more particularly to an agricultural implement to place rocks in a windrow for the convenient removal thereof from the field.

An object of the invention is to provide an implement for moving rocks systematically and efficiently into a windrow so that they may be more easily removed from the field.

The invention is embodied in a machine designed to be pulled by a tractor through plowed fields having a heterogeneous profusion of rocks of all shapes and sizes. The rock delivery part of the implement is composed of a shaft, cylinder or the like to which one or more spiral rows of teeth are fixed. The rock delivery member is set at an angle to the line of draft and is rotated from power available in the tractor. Therefore, as the implement is drawn through a field the rotary member is set into operation as it is pulled forward.

The rocks are worked along the rotary member by its forward translation through the field, the rotary motion of the member and the angle at which it is set with respect to the line of draft.

The implement, then, is an end delivery rock windrower causing the rock to be discharged in a neat windrow so that they may be subsequently gathered and removed.

Another object of the invention is to provide a rock windrower which operates dependently to achieve its intended purpose of removing rocks from the path of travel of the windrower and placing them so that they may be easily collected.

A more explicit object of the invention is to provide an implement for windrowing rocks, the implement having a main frame adapted to be drawn by a tractor or some other source of power which has a power take-off, there being a rotary toothed member adjustably carried by the main frame of the windrower and resiliently supported so that it is capable of yieldingly floating to some extent during the normal operation of the implement.

In addition, the rotary member is adjustable between raised and lower positions to facilitate turning at the end of a row and to facilitate transportation from one place to another. Yet, when it is desired to set the implement into operation, a very simple adjustment, for example operation of a single hydraulic cylinder, is all that is necessary to position the rotary member so that it is capable of gathering rocks in the sense that they are given a series of small kicks and progress generally longitudinally along the rotary member until they are discharged at one end in a neat windrow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of one of the implements, parts being broken away to illustrate otherwise hidden detail.

Figure 2 is an enlarged cross-sectional view taken approximately on the line 2—2 of Figure 1.

Figure 3 is an enlarged diagrammatic view such as would be seen at section 3—3 of Figure 1, this view showing by a schematic representation that there are three rows of teeth on the rotary member.

Figure 4 is a perspective view of a modification of the implement, this being identical in all respects to the implement of Figure 1 with the exception that the rotary member has only two rows of teeth thereon.

Figure 5 is a top view of the implement in Figure 4, on a reduced scale.

Figure 6 is an end view as would be seen when viewing approximately on the line 6—6 of Figure 5.

Figure 7 is another diagrammatic view taken approximately at the station 7—7 of Figure 5 and schematically showing that the rotary member has only two rows of teeth.

Figure 8:
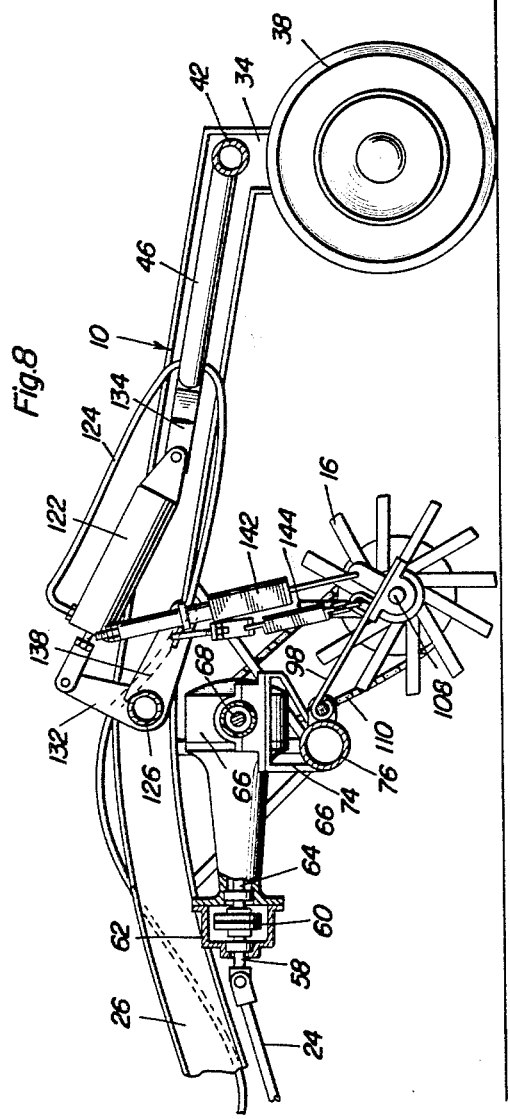
Figure 8 is a sectional view taken on the line 8—8 of Figure 5.
Figure 9:
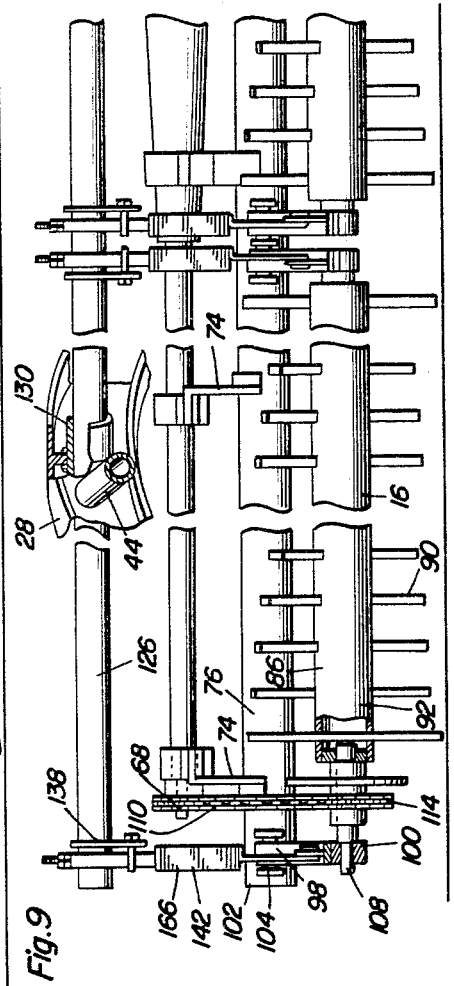
Figure 9 is an irregular sectional view taken approximately on the line 9—9 of Figure 5, on an enlarged scale.

In the accompanying drawings there is an implement 10 constructed to exemplify the principles of the invention. This implement is a rock windrower that is adapted to be drawn through a field by a tractor 12 or the like. The tractor is equipped with a power take-off 14 from which rotary rock windrowing member 18 obtains its torque. Main frame 18 of the rock windrower is attached by means of a conventional coupling 20 to the drawbar 22 of tractor 12, and shafting 24 is operatively connected with the power take-off of the tractor. The shafting has universal joints and bearings where found desirable and necessary.

Main frame 18 is made of a pair of structurally substantial sides 26 and 28 that are arched intermediate their forward ends 29 and 30 and their axle supporting depending rear end 32 and 34. Two ground engaging supporting wheels 36 and 38 are secured to an axle 40 at the rear ends of the frame sides 28 and 26, and they are located below the transverse frame member 42 which is made secure by braces 44 and 46 that extend diagonally between frame member 42 and sides 26 and 28. The forward ends 29 and 30 of sides 26 and 28 have a transverse frame member 50 to which a post 52 is secured. The post has a bearing 54 for a part of shafting 24 and in advance of universal joint 56. The universal joint is connected to a short shaft 58 to which slip clutch 60 is connected (Figure 8). The clutch is in a clutch housing 62 and is adapted to override should the rotary member 16 become inoperative, for example, if it should become jammed. The clutch 60 is driven by short shaft 58, and it transmits power to shaft 64, (Figure 8) to actuate the gears in the conventional gear transfer 66. The gear transfer 66 is made of gears in a gear case and they drive the lateral shafts 68 and 70 in the same direction. These shafts furnish power for rotary member 16 and are supported by a plurality of bearings 72, each being identical in construction. A typical bearing 72 is composed of the bearing structure and a short supporting bracket 74 welded or otherwise secured to transverse frame member 76. The transverse frame member is hung beneath the arched part of sides 26 and 28 and held rigidly supported by vertical braces 78 and diagonal braces 80 that are welded or otherwise rigidly secured to sides 26 and 28. Frame member 76 is the structural support for the rotary member 16.

The preferred organization of parts constituting the rotary member has the rotary frame member in two sections 86 and 88 with each section identical. As indicated previously, the preferred rotary frame member has three rows of teeth 90 (Figure 3), however, the windrower may be made with a different tooth pattern, for instance by having only two rows of teeth 91 (Figure 7). In each case, though, each row of teeth is arranged in a spiral. When three rows of teeth are used, the spirals are removed 120° from each other whereas when two rows of teeth 91 are used, the rows are removed 180° from each other. The number of rows may be increased or decreased. Typical section 86 has teeth 90 extending from a cylinder 92, or has teeth 91 extending from an identical cylinder. Each tooth is made slightly offset from a true radial direction to permit a better discharge of rocks from the teeth. Since there is complete identity between parts in the embodiments of Figures 1 and 5, numerical designation of parts is preserved between embodiments with the exception of the differentiating tooth pattern indicated by teeth 90 and 91 respectively. Section 86 of rotary members 16 has two support assemblies 94 and 96, one being at each end thereof. Support assembly 94 is made of a pivotal bracket 98 having a bearing 100 at the lower part of its outer end and having a pivot connection 102 at its inner end with frame member 76. The pivot connection may be made in several ways, one being a trunnion 104 to which bracket 98 is fixed, and the trunnion is mounted for oscillation in an ear 106 welded or otherwise secured to frame member 76. Shaft 108 is mounted in bearing 100 and is fixed to cylinder 92 thereby rotatively mounting cylinder 92 and the teeth thereon. Support 96 is identically constructed.

The means for propelling shaft 108 are seen best in Figure 6 and they are composed of chain 110 engaged with sprocket 112 secured to the end of shaft 68. The chain 110 is also entrained around the sprocket 114 that is fixed to shaft 108. Section 88 of the rotary member is supported and driven in an identical manner, there being chain 110 engaged with sprocket 116 at the outer end of shaft 70 and entrained over sprocket 118 that is fixed to the shaft of section 88 of rotary member 16.

There are means for raising and lowering the rotary member 16. The means are composed of a double-acting hydraulic cylinder 122, although a single acting hydraulic cylinder may be substituted. With a double-acting cylinder, though, the rotary member 16 may be adjusted to a selected height with respect to the main frame of the implement and that selected height may be kept. Hydraulic lines 124 are attached to the cylinder 122 and to a source of available hydraulic pressure on tractor 12, controlled by conventional controls carried by the tractor. An oscillatory hollow shaft 126 is mounted in bearings 128 and 130 in sides 26 and 28 of the main frame of the implement. Arm 132 is fixed to oscillatory shaft 126 and the hydraulic cylinder is pivotally attached to it. The hydraulic cylinder is also pivotally attached to bracket 134 on main frame side 26 to provide a reaction for the hydraulic cylinder. When the hydraulic cylinder is extended or retracted, the oscillatory shaft 126 is moved. For section 86 there are two arms 138 and 140 that protrude laterally from shaft 126. The arms are located at the ends of section 86 and are raised and lowered in response to oscillation of hollow shaft 126. There are two spring assemblies 142 and 144 operatively connected with arm 138 and with bracket 98 (Figure 6). The spring assemblies function as yielding means for lifting bracket 98 and as equalizing and compensating devices. Spring assembly 144 is made of spring 146 having its lower end attached to bracket 148 welded or otherwise fixed to bracket 98. The upper end of spring 146 is attached to bracket 150, and this has an adjusting bolt 152 carried by it and attached to an ear 154 on arm 138. As the arm 138 is lifted, bracket 98 is also lifted by means of bolt 152, bracket 150, spring 144 and ear 148. Spring assembly 142 is a compensating device with a rod 160 attached to bracket 94 and having a collar 162 secured thereto. Spring 166 seats on collar 162 and against a short sleeve 168 that bears against eye 170 fixed to arm 138. The rod 160 is passed through a sleeve 172 on the top of eye 170 and has nuts 174 adjustably attached to the upper threaded part thereof. Therefore, the spring 166 is capable of functioning as an equalizer spring, holding a yielding bias on section 86 at all times.

Inasmuch as assemblies which are duplicates of assemblies 142 and 144, are at each end of each section 86 and 88, both sections of rotary member 16 are yieldingly supported that is, they are capable of limited flotation.

In the construction of the implement rotary member 16 is disposed at an angle of 26° as measured from the line of draft of the implement. This means that the rocks will walk along the implement as it functions.

In use, the implement is attached to a tractor and pulled through a field. The elevation of the rotary member is selected by operation of the hydraulic cylinder. When pulled forward, the rotary member is set at an angle with reference to the direction of movement of the entire implement, and it rotates from a power take-off of the tractor. It is, though, contemplated to use a self-contained power plant on the implement should this be found desirable or necessary in some applications of the invention. As the rotary member 16 is operated the rocks move longitudinally along the member, each rock being given a series of small kicks by the teeth of the rotary member until the rocks are discharged at the end of the rotary member farthest from the tractor, leaving them in a neat windrow.

The present implement is capable of a swath of fifteen feet, although this may be increased or decreased depending on the size of implement 10. Further, as seen in Figure 1, the wheels 36 and 38 are set in from both extremities of rotary member 16 so that the wheels travel over soil that has rocks removed to the windrow end thereof. By operating the machine in two directions, that is, by making a north-south pass, for example, and then a south, north pass, the two swaths will deliver the rocks in a single windrow.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a rock windrower, a main frame having sides, a rotary member consisting essentially of a pair of sections, each section having an elongated rotary cylinder, a plurality of approximately radially extending teeth attached to said cylinder and arranged in one spiral from end-to-end of each cylinder, a transverse tubular frame member attached to said sides and in depending relationship to said sides, aligned power shafts, means mounting said power shafts on said transverse frame member for rotation, brackets having bearings in which each of the rotary cylinders is mounted behind said power shafts, means pivotally securing said bracket to said transverse frame member, means connected to said power shafts and said rotary cylinders for rotating said rotary cylinders in response to rotation of said power shaft, lift means connected to said sides and to said brackets for elevating said rotary cylinders.

2. In a rock windrower, a main frame having sides, a rotary member consisting essentially of a pair of sections, each section having an elongated rotary cylinder, a plurality of approximately radially extending teeth attached to said cylinders and arranged in one spiral from end-to-end of each cylinder, a transverse tubular frame member attached to said sides and in depending relationship to said sides, aligned power shafts, means mounting said power shaft on said transverse frame member for rotation, brackets having bearings in which each of the rotary cylinders is mounted behind said power shafts, means pivotally securing said bracket to said transverse frame member, means connected to said power shafts and said rotary cylinders for rotating said rotary cylinders in response to rotation of said power shaft, lift means connected to said sides and to said brackets for elevating said rotary member, said lift means including an oscillatory shaft, means connected to said oscillatory shaft and and a part of said main frame for oscillating said oscillatory shaft, spring assemblies, arms fixed to said oscillatory shaft and to said spring assemblies to displace said spring assemblies in response to oscillation of said oscillatory shaft, and means connecting said spring assemblies to said brackets.

3. In a rock windrower, a main frame having sides, a rotary member consisting essentially of a pair of sections, each section having an elongated rotary cylinder, a plurality of approximately radially extending teeth attached to said cylinder and arranged in one spiral from end-to-end of each cylinder, a transverse tubular frame member attached to said sides and in depending relationship to said sides, aligned power shafts, means mounting said power shaft on said transverse frame member for rotation, brackets having bearings in which each of the rotary cylinders is mounted behind said power shafts, means pivotally securing said bracket to said transverse frame member, means connected to said power shafts and said rotary cylinders for rotating said rotary cylinders in response to rotation of said power shaft, lift means connected to said sides and to said brackets for elevating said rotary member, said lift means including an oscillatory shaft, means connected to said oscillatory shaft and a part of said main frame for oscillating said oscillatory shaft, spring assemblies, arms fixed to said oscillatory shaft and to said spring assemblies to displace said spring assemblies in response to oscillation of said oscillatory shaft, and means connecting said spring assemblies to said brackets, equalizer spring assemblies operatively connected with said arms and said bracket.

4. In a rock windrower, a main frame having sides, a rotary member consisting essentially of a pair of sections, each section having an elongated rotary cylinder, a plurality of approximately radially extending teeth attached to said cylinders and arranged in one spiral from end-to-end of each cylinder, a transverse tubular frame member attached to said sides and in depending relationship to said sides, aligned power shafts, means mounting said power shafts on said transverse frame member for rotation, brackets having bearings in which each of the rotary cylinders is mounted behind said power shafts, means pivotally securing said bracket to said transverse frame member, means connected to said power shafts and said rotary cylinders for rotating said rotary cylinders in response to rotation of said power shaft, lift means connected to said sides and to said brackets for elevating said rotary cylinders, said lift means including an oscillatory shaft, means connected to said oscillatory shaft and a part of said main frame for oscillating said oscillatory shaft, spring assemblies, arms fixed to said oscillatory shaft and to said spring assemblies to displace said spring assemblies in response to oscillation of said oscillatory shaft, and means connecting said spring assemblies to said brackets, the sides of said main frame having depending rear ends, supporting ground wheels on said rear ends, said means for oscillating said oscillatory shaft including a hydraulic cylinder, an arm fixed to said oscillatory shaft and having one end of said hydraulic cylinder pivoted thereto, and means connected at the other end of said hydraulic cylinder and to a part of said frame for providing a reaction for the hydraulic cylinder when it is extended and retracted.

References Cited in the file of this patent

UNITED STATES PATENTS

| | | |
|---|---|---|
| 2,557,475 | Schieman | June 19, 1951 |
| 2,763,120 | Johnson | Sept. 18, 1956 |